United States Patent
Kim et al.

(10) Patent No.: US 10,373,026 B1
(45) Date of Patent: *Aug. 6, 2019

(54) LEARNING METHOD AND LEARNING DEVICE FOR GENERATION OF VIRTUAL FEATURE MAPS WHOSE CHARACTERISTICS ARE SAME AS OR SIMILAR TO THOSE OF REAL FEATURE MAPS BY USING GAN CAPABLE OF BEING APPLIED TO DOMAIN ADAPTATION TO BE USED IN VIRTUAL DRIVING ENVIRONMENTS

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: Stradvision, INC., Gyeongbuk (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,355

(22) Filed: Jan. 28, 2019

(51) Int. Cl.
*G06K 9/00* (2006.01)
*G06K 9/62* (2006.01)
(Continued)

(52) U.S. Cl.
CPC ....... *G06K 9/6262* (2013.01); *G06K 9/00791* (2013.01); *G06K 9/46* (2013.01);
(Continued)

(58) Field of Classification Search
CPC ....... G06K 9/6257; G06T 7/246; G06T 15/10; G06T 19/006; G06T 2207/20081; G06F 17/11; G06N 3/0454
See application file for complete search history.

(56) References Cited

U.S. PATENT DOCUMENTS

2018/0239951 A1* 8/2018 El-Zehiry .......... G06K 9/00147
2018/0336439 A1* 11/2018 Kliger ................. G06N 3/0454
(Continued)

*Primary Examiner* — Shefali D Goradia
(74) *Attorney, Agent, or Firm* — FisherBroyles, LLP; Susan M. Oiler

(57) ABSTRACT

A method of learning for deriving virtual feature maps from virtual images, whose characteristics are same as or similar to those of real feature maps derived from real images, by using GAN including a generating network and a discriminating network capable of being applied to domain adaptation is provided to be used in virtual driving environments. The method includes steps of: (a) a learning device instructing the generating network to apply convolutional operations to an input image, to thereby generate a output feature map, whose characteristics are same as or similar to those of the real feature maps; and (b) instructing a loss unit to generate losses by referring to an evaluation score, corresponding to the output feature map, generated by the discriminating network. By the method using a runtime input transformation, a gap between virtuality and reality can be reduced, and annotation costs can be reduced.

20 Claims, 3 Drawing Sheets

(51) Int. Cl.
G06N 5/04 (2006.01)
G06N 3/08 (2006.01)
G06N 3/04 (2006.01)
G06K 9/46 (2006.01)

(52) U.S. Cl.
CPC ......... *G06K 9/6256* (2013.01); *G06N 3/0454* (2013.01); *G06N 3/088* (2013.01); *G06N 5/046* (2013.01)

(56) References Cited

U.S. PATENT DOCUMENTS

2018/0336471 A1* 11/2018 Rezagholizadeh .. G06N 3/0454
2018/0341836 A1* 11/2018 Lim ...................... G06T 3/4053
2019/0035118 A1* 1/2019 Zhao .................... G06T 3/4046
2019/0080206 A1* 3/2019 Hotson ................ G06K 9/6264

* cited by examiner

LEARNING METHOD AND LEARNING DEVICE FOR GENERATION OF VIRTUAL FEATURE MAPS WHOSE CHARACTERISTICS ARE SAME AS OR SIMILAR TO THOSE OF REAL FEATURE MAPS BY USING GAN CAPABLE OF BEING APPLIED TO DOMAIN ADAPTATION TO BE USED IN VIRTUAL DRIVING ENVIRONMENTS

FIELD OF THE DISCLOSURE

The present disclosure relates to a learning method and a learning device, a testing method and a testing device for use with an autonomous vehicle, virtual driving, and the like; and more particularly, to the learning method and the learning device for generating virtual feature maps whose characteristics are same or similar to those of real feature maps by using GAN, and the testing method and the testing device using the same.

BACKGROUND OF THE DISCLOSURE

Deep Convolution Neural Networks (Deep CNNs) are at the heart of the remarkable development in deep learning. CNNs have already been used in the 90's to solve problems of character recognition, but their use has become as widespread as it is now thanks to recent researches. These CNNs won the 2012 ImageNet image classification tournament, crushing other competitors. Then, the CNNs became a very useful tool in the field of machine learning.

Recently, the CNNs have been popular in an autonomous vehicles industry. When used in the autonomous vehicles industry, the CNNs perform functions of acquiring images from a camera installed on a vehicle, searching for lanes, etc. In order to perform these functions, the CNNs learn parameters by using training images on a real world and their corresponding GTs. Shortcoming of this kind of a traditional approach is that acquiring training images on a real world and generating their corresponding GTs should be done by people, not automatically by a programmed computer, resulting in high cost on training processes.

An alternative approach for training the CNNs is using virtual images on a virtual world simulated by a programmed computer. Herein, the virtual images and their corresponding GTs can be acquired automatically by the programmed computer, resulting in much lower cost on training processes, comparing to the traditional approach.

However, a shortcoming of this alternative approach is that the CNNs learn parameters by using the virtual images, resulting in degradation of a performance on detecting objects included in real images on the real world, whose characteristics are slightly different from those of the virtual images.

SUMMARY OF THE DISCLOSURE

It is an object of the present disclosure to solve all the aforementioned problems.

It is another object of the present disclosure to provide a method for generating virtual feature maps whose characteristics are similar to those of real feature maps generated by using real images by using a GAN, to thereby allow an object detector having been learned by using the virtual images to detect objects included in the real images, i.e., test images, more efficiently.

In accordance with one aspect of the present disclosure, there is provided a method of learning for deriving one or more virtual feature maps from one or more virtual images, whose one or more characteristics are same as or similar to those of one or more real feature maps derived from one or more real images, by using GAN (Generative Adversarial Network) including a generating network and a discriminating network, including steps of: (a) a learning device, if at least one input image which is one of the virtual images is acquired, instructing the generating network to apply one or more convolutional operations to the input image, to thereby generate at least one output feature map, whose characteristics are same as or similar to those of the real feature maps; and (b) the learning device, if at least one evaluation score, corresponding to the output feature map, generated by the discriminating network is acquired, instructing a first loss unit to generate at least one first loss by referring to the evaluation score, and learning parameters of the generating network by backpropagating the first loss.

As one example, the learning device instructs the discriminating network, capable of determining whether its own inputted feature map is one of the real feature maps or one of the virtual feature maps, to generate at least one probability of the output feature map being real or fake, to thereby generate the evaluation score.

As one example, the discriminating network, if the output feature map, at least one real training feature map generated by using some of the real images, and their corresponding GTs are acquired, instructs a second loss unit, corresponding to the discriminating network, to generate at least one second loss by referring to (i) evaluation scores for training on the output feature map and the real training feature map generated by the discriminating network, and (ii) the GTs, and learn parameters thereof by backpropagating the second loss, to thereby determine a probability of some feature map to be inputted being real or fake.

As one example, the learning device instructs an object detection network to generate each of one or more class scores corresponding to each of one or more objects included in the input image by referring to the output feature map.

As one example, the learning device instructs a third loss unit to generate at least one third loss by referring to the class scores and their corresponding GTs, and learn parameters of the generating network and the object detection network by backpropagating the third loss.

As one example, the object detection network, if each of one or more ROIs on the input image generated by an RPN is acquired, instructs a convolutional layer to apply one or more convolutional operations to each of regions on the output feature map corresponding to each of the ROIs, to thereby generate each of partial feature maps per each of ROIs, and instructs an FC layer to generate information on each of one or more classes of the objects included in the input image by referring to each of the partial feature maps, to thereby generate the class scores.

As one example, the RPN generates at least one RPN loss by referring to each of the ROIs and each of their corresponding GTs, and learns parameters thereof by backpropagating the RPN loss, to thereby raise probabilities of some objects included in some images to be inputted being located in some ROIs generated by the RPN.

In accordance with another aspect of the present disclosure, there is provided a method of testing for deriving one or more virtual feature maps from one or more virtual images, whose one or more characteristics are same as or similar to those of one or more real feature maps for testing derived from one or more real images, by using GAN (Generative Adversarial Network) including a generating network and a discriminating network, including a step of: on condition that (1) a learning device has instructed the generating network to apply one or more convolutional operations to at least one training image which is one of the virtual images, to thereby generate at least one output feature map for training whose characteristics are same as or similar to those of one or more real feature maps for training, and (2) the learning device has instructed a first loss unit to generate at least one first loss by referring to at least one evaluation score, corresponding to the output feature map for training generated by the discriminating network, and learning parameters of the generating network by backpropagating the first loss; a testing device, if at least one test image which is one of the virtual images is acquired, instructing the generating network to apply said one or more convolutional operations to the test image, to thereby generate at least one output feature map for testing, whose characteristics are same as or similar to those of the real feature maps for testing.

As one example, an object detection network detects one or more objects included in the test image by referring to the output feature map for testing.

As one example, the test image is acquired through a camera included in an autonomous vehicle including the object detection network, and the object detection network supports the autonomous vehicle by using the test image.

In accordance with still another aspect of present disclosure, there is provided a learning device for deriving one or more virtual feature maps from one or more virtual images, whose one or more characteristics are same as or similar to those of one or more real feature maps derived from one or more real images, by using GAN (Generative Adversarial Network) including a generating network and a discriminating network, including: at least one memory that stores instructions; and at least one processor configured to execute the instructions to perform processes of: (I) if at least one input image which is one of the virtual images is acquired, instructing the generating network to apply one or more convolutional operations to the input image, to thereby generate at least one output feature map, whose characteristics are same as or similar to those of the real feature maps, and (II), if at least one evaluation score, corresponding to the output feature map, generated by the discriminating network is acquired, instructing a first loss unit to generate at least one first loss by referring to the evaluation score, and learning parameters of the generating network by backpropagating the first loss.

As one example, the processor instructs the discriminating network, capable of determining whether its own inputted feature map is one of the real feature maps or one of the virtual feature maps, to generate at least one probability of the output feature map being real or fake, to thereby generate the evaluation score.

As one example, the discriminating network, if the output feature map, at least one real training feature map generated by using some of the real images, and their corresponding GTs are acquired, instructs a second loss unit, corresponding to the discriminating network, to generate at least one second loss by referring to (i) evaluation scores for training on the output feature map and the real training feature map generated by the discriminating network, and (ii) the GTs, and learn parameters thereof by backpropagating the second loss, to thereby determine a probability of some feature map to be inputted being real or fake.

As one example, the processor instructs an object detection network to generate each of one or more class scores corresponding to each of one or more objects included in the input image by referring to the output feature map.

As one example, the processor instructs a third loss unit to generate at least one third loss by referring to the class scores and their corresponding GTs, and learn parameters of the generating network and the object detection network by backpropagating the third loss.

As one example, the object detection network, if each of one or more ROIs on the input image generated by an RPN is acquired, instructs a convolutional layer to apply one or more convolutional operations to each of regions on the output feature map corresponding to each of the ROIs, to thereby generate each of partial feature maps per each of ROIs, and instructs an FC layer to generate information on each of one or more classes of the objects included in the input image by referring to each of the partial feature maps, to thereby generate the class scores.

As one example, the RPN generates at least one RPN loss by referring to each of the ROIs and each of their corresponding GTs, and learns parameters thereof by backpropagating the RPN loss, to thereby raise probabilities of some objects included in some images to be inputted being located in some ROIs generated by the RPN.

In accordance with still yet another aspect of the present disclosure, there is provided a testing device for deriving one or more virtual feature maps from one or more virtual images, whose one or more characteristics are same as or similar to those of one or more real feature maps for testing derived from one or more real images, by using GAN (Generative Adversarial Network) including a generating network and a discriminating network, including: at least one memory that stores instructions; and at least one processor, on condition that (1) a learning device has instructed the generating network to apply one or more convolutional operations to at least one training image which is one of the virtual images, to thereby generate at least one output feature map for training, whose characteristics are same as or similar to those of one or more real feature maps for training, and (2) the learning device has instructed a first loss unit to generate at least one first loss by referring to at least one evaluation score, corresponding to the output feature map for training, generated by the discriminating network, and learning parameters of the generating network by backpropagating the first loss; configured to execute the instructions to: perform a process of, if at least one test image which is one of the virtual images is acquired, instructing the generating network to apply said one or more convolutional operations to the test image, to thereby generate at least one output feature map for testing, whose characteristics are same as or similar to those of the real feature maps for testing.

As one example, an object detection network detects one or more objects included in the test image by referring to the output feature map for testing.

As one example, the test image is acquired through a camera included in an autonomous vehicle including the object detection network, and the object detection network supports the autonomous vehicle by using the test image.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION

Figure 1:
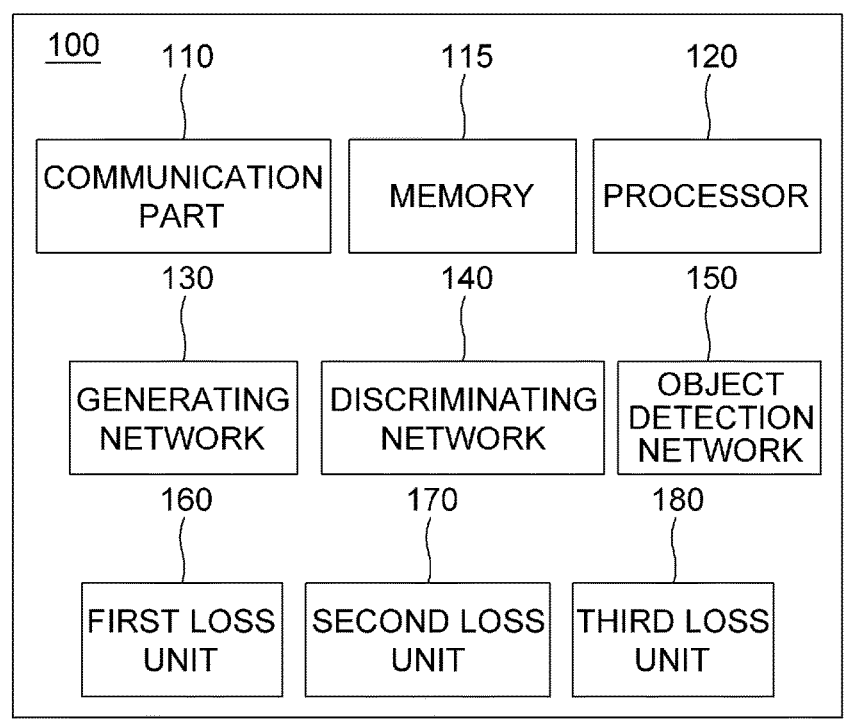
FIG. 1 is a drawing schematically illustrating a configuration of a learning device performing a method for learning generation of virtual feature maps whose characteristics are same as or similar to those of real feature maps by using GAN in accordance with one embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a configuration of a learning device performing a method for learning generation of virtual feature maps whose characteristics are same as or similar to those of real feature maps by using GAN in accordance with one embodiment of the present disclosure.

By referring to FIG. 1, the learning device 100 may include a generating network 130, a discriminating network 140, an object detection network 150, a first loss unit 160, a second loss unit 170 and a third loss unit 180, which are components to be described later. Processes of input/output and computation of the generating network 130, the discriminating network 140, the object detection network 150, the first loss unit 160, the second loss unit 170 and the third loss unit 180 may be respectively performed by a communication part 110 and a processor 120. However, detailed communication schematics between the communication part 110 and the processor 120 is omitted in FIG. 1. Herein, a memory 115 may have stored various instructions to be described later, and the processor 120 may execute the instructions stored in the memory 115 and may perform processes of the present disclosure by executing the processes to be disclosed later. Such description of the learning device 100 does not exclude an integrated device including any combination of a processor, a memory, a medium, or any other computing components.

So far the configurations of the learning device 100 which performs the method for learning the generation of the virtual feature maps whose characteristics are same as or similar to those of the real feature maps by using the GAN in accordance with one embodiment of the present disclosure have been explained. Below, the learning method as shown above will be explained.

Figure 2:
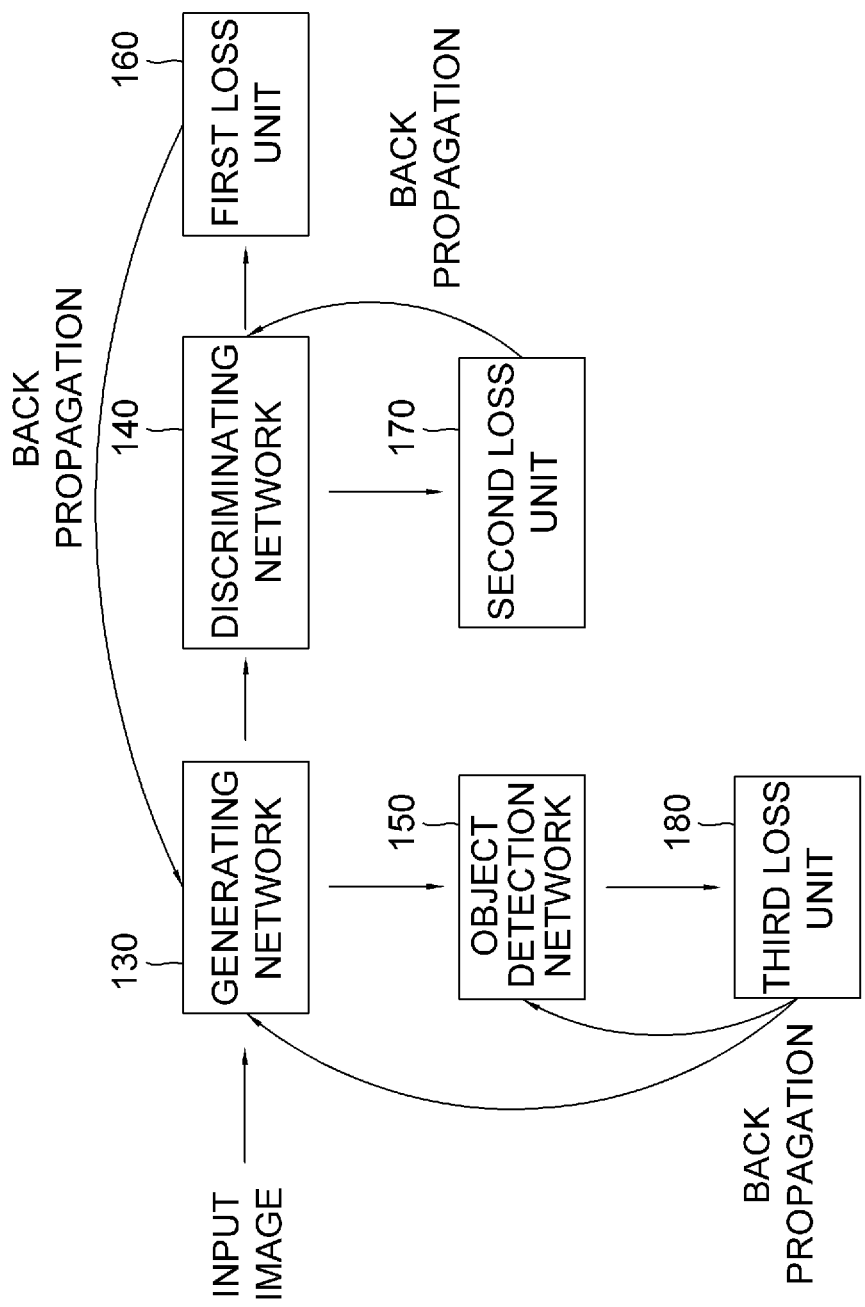
FIG. 2 is a drawing schematically illustrating a flow of the method for learning the generation of the virtual feature maps whose characteristics are same as or similar to those of the real feature maps by using the GAN in accordance with one embodiment of the present disclosure.

FIG. 2 is a drawing schematically illustrating a flow of the method for learning the generation of the virtual feature maps whose characteristics are same as or similar to those of the real feature maps by using the GAN in accordance with one embodiment of the present disclosure.

By referring to FIG. 2, a brief flow of the learning method may be seen. First, if at least one input image is acquired, the generating network 130 may generate at least one output feature map, and deliver it to the discriminating network 140 and the object detection network 150. Thereafter, the discriminating network 140 may generate at least one evaluation score on the output feature map, and deliver it to the first loss unit 160 and the second loss unit 170. Also, the object detection network 150 may generate one or more class scores, and deliver those to the third loss unit 180. And, the first loss unit 160, the second loss unit 170, and the third loss unit 180 may generate at least one first loss, at least one second loss, and at least third loss respectively, and support their corresponding networks to learn parameters thereof by backpropagating those losses.

Specifically, the learning device 100 may acquire said at least one input image, and feed it to the generating network 130. The input image may be one of the virtual images. Herein, the virtual images may be a virtually photographed image on a virtual world simulated by a programmed computer. After, the learning device 100 may instruct the generating network 130 to apply one or more convolutional operations to the input image, to thereby generate said at least one output feature map, whose characteristics are same as or similar to those of the real feature maps. Herein, "A is similar to B" means that a degree of similarity between A and B is same as or larger than a predetermined threshold. Further, the degree of similarity therebetween may be determined by using one of various well-known techniques but the detailed explanation thereon is omitted. Herein, the real feature maps can be derived from real images, which are some of really photographed images on a real world, different from the virtual feature maps. Also, the characteristics of the real feature maps may include characteristics resulted from those of the real images, which include a low chroma, a low contrast, relatively omitted details of objects, and relatively sophisticated, realistic routes of rays.

After, the learning device 100 may deliver the output feature map to the discriminating network 140 and the object detection network 150. First, processes performed by the discriminating network 140 may be explained.

The learning device 100 may instruct the discriminating network 140 to calculate at least one probability of the output feature map being real or fake, to thereby generate said at least one evaluation score. Herein, the discriminating network 140 may determine whether its own inputted feature map is one of the real feature maps or one of the virtual feature maps, by applying at least part of one or more convolutional operations and one or more FC operations to the inputted feature map. How the discriminating network 140 is trained will be explained later, along with the second loss unit 170.

And, the learning device 100 may instruct the object detection network 150 to detect one or more objects included in the input image by referring to the output feature map, to thereby generate said one or more class scores. In order to explain the object detection network 150, FIG. 3 will be referred to.

Figure 3:
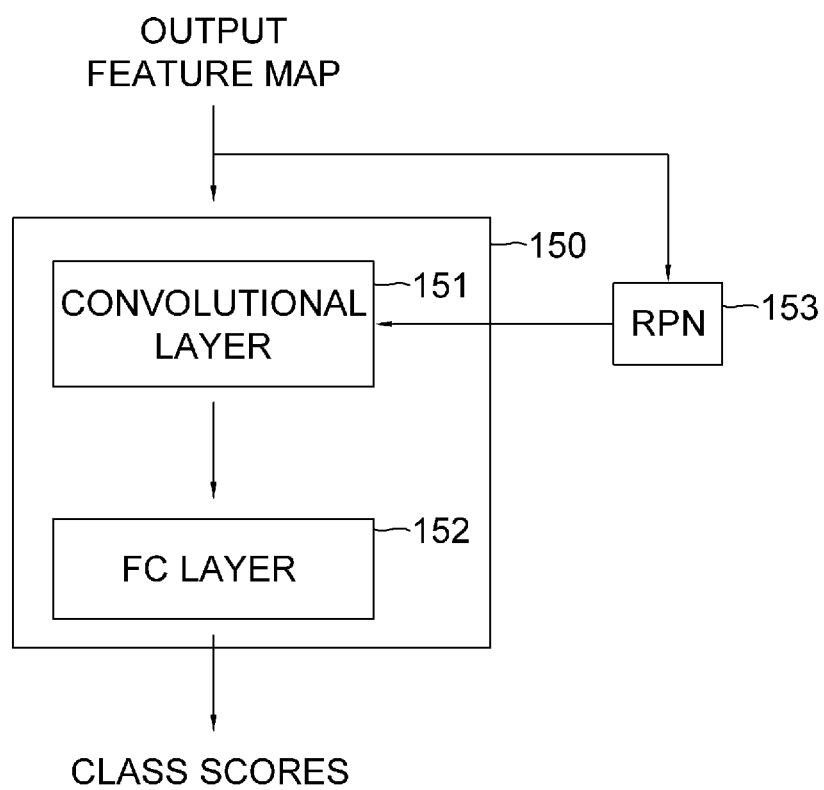
FIG. 3 is a drawing schematically illustrating an object detection network and its corresponding RPN for performing the method for learning the generation of the virtual feature maps whose characteristics are same as or similar to those of the real feature maps by using the GAN in accordance with one embodiment of the present disclosure.

FIG. 3 is a drawing schematically illustrating an object detection network and its corresponding RPN for performing the method for learning the generation of the virtual feature maps whose characteristics are same as or similar to those of the real feature maps by using the GAN in accordance with one embodiment of the present disclosure.

By referring to FIG. 3, it can be seen that the object detection network 150 may generate the class scores through a convolutional layer 151 and an FC layer 152, which are included therein, along with a support of an RPN 153.

First, the RPN 153, i.e., the Region Proposal Network, may acquire each of ROIs on the input image, by referring to the output feature map. The ROIs, i.e., Region of Interest, may be regions where the RPN 153 estimates the objects to be located. The RPN 153 may generate at least one RPN loss by referring to each of the ROIs and each of their corresponding GTs, and learn parameters thereof by backpropagating the RPN loss, to thereby raise probabilities of some objects included in some images to be inputted being located in some ROIs generated by the RPN 153.

After the ROIs are generated by the RPN 153, the object detection network 150 may instruct the convolutional layer 151 to apply one or more convolutional operations to each of regions on the output feature map corresponding to each of the ROIs, to thereby generate each of partial feature maps per each of ROIs. And, the object detection network 150 may instruct the FC layer 152 to generate information on each of one or more classes of the objects included in the input image by referring to each of the partial feature maps per each of the ROIs. The class information may include each of probabilities of each of the objects of the input image being included in each corresponding class, and each of the class scores may include the probabilities corresponding to each of the objects.

The object detection network 150 may include configurations as shown above, but the scope of the present disclosure is not limited thereto.

So far how the evaluation score and the class scores are generated have been explained. Below, how the evaluation score and the class scores can be processed will be explained.

The evaluation score may be delivered to the first loss unit 160 and the second loss unit 170, and the class scores may be delivered to the third loss unit 180. First, the first loss unit 160 will be explained.

The learning device 100 may instruct the first loss unit 160 to generate said at least one first loss by referring to the evaluation score generated by the discriminating network 140. The first loss may allow parameters of the generating network 130 to be adjusted to deceive the discriminating network 140, so that a feature map to be generated by the generating network 130, which is one of the virtual feature maps though, may be determined as one of the real feature maps by the discriminating network 140. As the first loss is generated as shown above, the learning device 100 may instruct the first loss unit 160 to learn the parameters of the generating network 130 by backpropagating the first loss.

And, the second loss unit 170 supports the discriminating network 140 to learn parameters thereof. Specifically, the learning device 100 may instruct the discriminating network 140 to acquire not only the output feature map, but also at least one real training feature map derived from some of the real images, and their corresponding GTs. Herein, the discriminating network 140 may generate evaluation scores for training of the discriminating network 140 on its own inputted feature maps, including the output feature map and the real training feature map. Thereafter, the second loss unit 170 may acquire the evaluation scores for training of the discriminating network 140 and their corresponding GTs, and generate said at least one second loss by referring to the evaluation scores for training of the discriminating network 140 and their corresponding GTs. Then, the second loss is backpropagated to learn parameters of the discriminating network 140, to thereby precisely determine whether a feature map to be inputted is one of the real feature maps or the virtual feature maps.

The learning processes of the discriminating network 140 by using the second loss unit 170 and the learning processes of the generating network 130 by using the first loss unit 160 may be performed concurrently, so that the parameters of the generating network 130 and the parameters of the discriminating network 140 can be learned competitively.

The third loss unit 180 supports the generating network 130 and the object detection network 150 to learn parameters thereof. Specifically, the learning device 100 may instruct the third loss unit 180 to generate said at least one third loss by referring to the class scores and their corresponding GTs. In case the third loss is used to learn parameters of the object detection network 150, the third loss may allow parameters of the object detection network 150 to be adjusted to detect objects included in images corresponding to some feature maps to be inputted more efficiently. In case the third loss is used to learn parameters of the generating network 130, the third loss may allow parameters of the generating network 130 to be adjusted to generate optimized feature maps which may support the object detection network 150 to detect objects by using the optimized feature maps better. By further using the third loss, the generating network 130 may generate some feature maps which includes characteristics of objects included in some images to be inputted.

Herein, in the backpropagation processes using the third loss, each of gradients corresponding to each of layers included in the generating network 130 and the object detection network 150 may be calculated by using an interaction formula among the networks, and the parameters of the networks may be learned by using the calculated gradients.

So far the learning processes have been explained. Below, their corresponding testing processes will be explained. For reference, in the description below, the phrase "for training" or "training" is added for terms related to the learning process, and the phrase "for testing" or "testing" is added for terms related to the testing process, to avoid possible confusion.

The learning device 100 as shown above may be tested as shown below. A testing device may denote a learning device 100 whose parameters are fully learned.

First, on condition that (1) the learning device 100, if at least one training image which is one of the virtual images is acquired, has instructed the generating network 130 to apply one or more convolutional operations to the training image, to thereby generate at least one output feature map for training, whose characteristics are same as or similar to those of the real feature maps; and (2) the learning device 100, if at least one evaluation score, corresponding to the output feature map for training, generated by the discriminating network 140 is acquired, has instructed a first loss unit to generate at least one first loss by referring to the evaluation score, and learning parameters of the generating network by backpropagating the first loss, the testing device, if at least one test image which is one of the virtual images is acquired, instructing the generating network 130 to apply said one or more convolutional operations to the test image, to thereby generate at least one output feature map for testing, whose characteristics are same as or similar to those of the real feature maps.

When testing, the object detection network 150 may be used to support an autonomous driving in the real world. Specifically, the test image may be acquired through a camera included in an autonomous vehicle including the object detection network 150, and the object detection network 150 may support the autonomous vehicle by using the test image.

Since the object detection network 150 have been learned by using the virtual feature maps whose characteristics are same as or similar to those of the real feature maps, the object detection network 150 may work well in the real world even though it have been learned in the virtual world.

It is a positive effect of the present disclosure to provide a method for generating virtual feature maps whose characteristics are similar to those of real feature maps generated by using real images by using a GAN, to thereby allow an object detector having been learned by using the virtual images to detect objects included in the real images, i.e., test images, more efficiently.

As can be understood by those skilled in the art, it is clear that communication parts of the learning device and the testing device may perform transmission of image data, for example, images described above like the original image, original labels, and additional labels, etc., and that processors and/or memories of the learning device and the testing device may retain data for feature maps and performing operations, and that the processors of the learning device and the testing device may perform convolution operations, deconvolution operations, and loss value operations, but the scope of the present disclosure is not limited thereto.

The present disclosure has an effect of alleviating a problem of procuring the sets of the training images in the non-RGB format by transforming the sets of the training images in the RGB format into those in the non-RGB format with a cycle GAN (Generative Adversarial Network) capable of being applied to domain adaptation.

Thus, the method in accordance with the present disclosure can be performed to be used in virtual driving environments by using a runtime input transformation. Further, a gap between virtuality and reality, and annotation costs can be reduced by the method.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method of learning for deriving one or more virtual feature maps from one or more virtual images, whose one or more characteristics are same as or similar to those of one or more real feature maps derived from one or more real images, by using GAN (Generative Adversarial Network) including a generating network and a discriminating network, comprising steps of:

(a) a learning device, if at least one input image which is one of the virtual images is acquired, instructing the generating network to apply one or more convolutional operations to the input image, to thereby generate at least one output feature map, whose characteristics are same as or similar to those of the real feature maps; and (b) the learning device, if at least one evaluation score, corresponding to the output feature map, generated by the discriminating network is acquired, instructing a first loss unit to generate at least one first loss by referring to the evaluation score, and learning parameters of the generating network by backpropagating the first loss.

2. The method of claim 1, wherein the learning device instructs the discriminating network, capable of determining whether its own inputted feature map is one of the real feature maps or one of the virtual feature maps, to generate at least one probability of the output feature map being real or fake, to thereby generate the evaluation score.

3. The method of claim 2, wherein the discriminating network, if the output feature map, at least one real training feature map generated by using some of the real images, and their corresponding GTs are acquired, instructs a second loss unit, corresponding to the discriminating network, to generate at least one second loss by referring to (i) evaluation scores for training on the output feature map and the real training feature map generated by the discriminating network, and (ii) the GTs, and learn parameters thereof by backpropagating the second loss, to thereby determine a probability of some feature map to be inputted being real or fake.

4. The method of claim 1, wherein the learning device instructs an object detection network to generate each of one or more class scores corresponding to each of one or more objects included in the input image by referring to the output feature map.

5. The method of claim 4, wherein the learning device instructs a third loss unit to generate at least one third loss by referring to the class scores and their corresponding GTs, and learn parameters of the generating network and the object detection network by backpropagating the third loss.

6. The method of claim 4, wherein the object detection network, if each of one or more ROIs on the input image generated by an RPN is acquired, instructs a convolutional layer to apply one or more convolutional operations to each of regions on the output feature map corresponding to each of the ROIs, to thereby generate each of partial feature maps per each of ROIs, and instructs an FC layer to generate information on each of one or more classes of the objects included in the input image by referring to each of the partial feature maps, to thereby generate the class scores.

7. The method of claim 6, wherein the RPN generates at least one RPN loss by referring to each of the ROIs and each of their corresponding GTs, and learns parameters thereof by backpropagating the RPN loss, to thereby raise probabilities of some objects included in some images to be inputted being located in some ROIs generated by the RPN.

8. A method of testing for deriving one or more virtual feature maps from one or more virtual images, whose one or more characteristics are same as or similar to those of one or more real feature maps for testing derived from one or more real images, by using GAN (Generative Adversarial Network) including a generating network and a discriminating network, comprising a step of:

on condition that (1) a learning device has instructed the generating network to apply one or more convolutional operations to at least one training image which is one of the virtual images, to thereby generate at least one output feature map for training, whose characteristics are same as or similar to those of one or more real feature maps for training, and (2) the learning device has instructed a first loss unit to generate at least one first loss by referring to at least one evaluation score, corresponding to the output feature map for training, generated by the discriminating network, and learning parameters of the generating network by backpropagating the first loss; a testing device, if at least one test image which is one of the virtual images is acquired, instructing the generating network to apply said one or more convolutional operations to the test image, to thereby generate at least one output feature map for testing, whose characteristics are same as or similar to those of the real feature maps for testing.

9. The method of claim 8, wherein an object detection network detects one or more objects included in the test image by referring to the output feature map for testing.

10. The method of claim 9, wherein the test image is acquired through a camera included in an autonomous vehicle including the object detection network, and the object detection network supports the autonomous vehicle by using the test image.

11. A learning device for deriving one or more virtual feature maps from one or more virtual images, whose one or more characteristics are same as or similar to those of one or more real feature maps derived from one or more real images, by using GAN (Generative Adversarial Network) including a generating network and a discriminating network, comprising:

at least one memory that stores instructions; and
at least one processor configured to execute the instructions to perform processes of: (I) if at least one input image which is one of the virtual images is acquired, instructing the generating network to apply one or more convolutional operations to the input image, to thereby generate at least one output feature map, whose characteristics are same as or similar to those of the real feature maps, and (II), if at least one evaluation score, corresponding to the output feature map, generated by the discriminating network is acquired, instructing a first loss unit to generate at least one first loss by referring to the evaluation score, and learning parameters of the generating network by backpropagating the first loss.

12. The learning device of claim 11, wherein the processor instructs the discriminating network, capable of determining whether its own inputted feature map is one of the real feature maps or one of the virtual feature maps, to generate at least one probability of the output feature map being real or fake, to thereby generate the evaluation score.

13. The learning device of claim 12, wherein the discriminating network, if the output feature map, at least one real training feature map generated by using some of the real images, and their corresponding GTs are acquired, instructs a second loss unit, corresponding to the discriminating network, to generate at least one second loss by referring to (i) evaluation scores for training on the output feature map and the real training feature map generated by the discriminating network, and (ii) the GTs, and learn parameters thereof by backpropagating the second loss, to thereby determine a probability of some feature map to be inputted being real or fake.

14. The learning device of claim 11, wherein the processor instructs an object detection network to generate each of one or more class scores corresponding to each of one or more objects included in the input image by referring to the output feature map.

15. The learning device of claim 14, wherein the processor instructs a third loss unit to generate at least one third loss by referring to the class scores and their corresponding GTs, and learn parameters of the generating network and the object detection network by backpropagating the third loss.

16. The learning device of claim 14, wherein the object detection network, if each of one or more ROIs on the input image generated by an RPN is acquired, instructs a convolutional layer to apply one or more convolutional operations to each of regions on the output feature map corresponding to each of the ROIs, to thereby generate each of partial feature maps per each of ROIs, and instructs an FC layer to generate information on each of one or more classes of the objects included in the input image by referring to each of the partial feature maps, to thereby generate the class scores.

17. The learning device of claim 16, wherein the RPN generates at least one RPN loss by referring to each of the ROIs and each of their corresponding GTs, and learns parameters thereof by backpropagating the RPN loss, to thereby raise probabilities of some objects included in some images to be inputted being located in some ROIs generated by the RPN.

18. A testing device for deriving one or more virtual feature maps from one or more virtual images, whose one or more characteristics are same as or similar to those of one or more real feature maps for testing derived from one or more real images, by using GAN (Generative Adversarial Network) including a generating network and a discriminating network, comprising:
   at least one memory that stores instructions; and
   at least one processor, on condition that (1) a learning device has instructed the generating network to apply one or more convolutional operations to at least one training image which is one of the virtual images, to thereby generate at least one output feature map for training, whose characteristics are same as or similar to those of one or more real feature maps for training, and (2) the learning device has instructed a first loss unit to generate at least one first loss by referring to at least one evaluation score, corresponding to the output feature map for training, generated by the discriminating network, and learning parameters of the generating network by backpropagating the first loss; configured to execute the instructions to: perform a process of, if at least one test image which is one of the virtual images is acquired, instructing the generating network to apply said one or more convolutional operations to the test image, to thereby generate at least one output feature map for testing, whose characteristics are same as or similar to those of the real feature maps for testing.

19. The testing device of claim 18, wherein an object detection network detects one or more objects included in the test image by referring to the output feature map for testing.

20. The testing device of claim 19, wherein the test image is acquired through a camera included in an autonomous vehicle including the object detection network, and the object detection network supports the autonomous vehicle by using the test image.

* * * * *